(12) United States Patent
Uchida et al.

(10) Patent No.: US 8,696,932 B2
(45) Date of Patent: Apr. 15, 2014

(54) LIQUID-CRYSTALLINE POLYMER COMPOSITION

(75) Inventors: Hiroto Uchida, Osaka (JP); Hitoshi Tsuchiya, Osaka (JP)

(73) Assignee: Ueno Fine Chemicals Industry, Ltd., Osaka-Shi (JP)

( * ) Notice: Subject to any disclaimer, the term of this patent is extended or adjusted under 35 U.S.C. 154(b) by 0 days.

(21) Appl. No.: 13/559,191

(22) Filed: Jul. 26, 2012

(65) Prior Publication Data
US 2013/0026413 A1 Jan. 31, 2013

(30) Foreign Application Priority Data
Jul. 27, 2011 (JP) ................................ 2011-164460

(51) Int. Cl.
| | | |
|---|---|---|
| *C09K 19/52* | (2006.01) | |
| *C09K 19/06* | (2006.01) | |
| *C09K 19/32* | (2006.01) | |
| *C09K 19/12* | (2006.01) | |
| *C09K 19/00* | (2006.01) | |
| *C09K 19/02* | (2006.01) | |

(52) U.S. Cl.
USPC ............. 252/299.01; 252/299.6; 252/299.62; 252/299.66; 428/1.1; 428/1.3; 349/167; 349/182

(58) Field of Classification Search
USPC ............... 252/299.01, 299.6, 299.62, 299.66; 428/1.1, 1.3; 349/167, 182
See application file for complete search history.

(56) References Cited

U.S. PATENT DOCUMENTS

| | | |
|---|---|---|
| 5,352,746 A | 10/1994 | Asai et al. |
| 5,766,507 A | 6/1998 | Nakai |

FOREIGN PATENT DOCUMENTS

| | | |
|---|---|---|
| JP | 2-173156 A | 7/1990 |
| JP | 3-95260 A | 4/1991 |
| JP | 6-32880 A | 2/1994 |
| JP | 2000-309636 A | 11/2000 |

*Primary Examiner* — Geraldina Visconti
(74) *Attorney, Agent, or Firm* — Sughrue Mion, PLLC

(57) ABSTRACT

The present invention provides a liquid-crystalline polymer composition comprising: 100 parts by weight of a liquid-crystalline polymer and 1-150 parts by weight of the total weight of talc particles (A) and talc particles (B),
wherein
talc particles (A) have an aspect ratio of 3.1-5.0 and a median particle diameter of 5-100 μm; and
talc particles (B) have an aspect ratio of 1.0-3.0 and a median particle diameter of 5-100 μm;
wherein the weight ratio of talc particles (A)/talc particles (B) is from 1/9 to 9/1, and wherein the
liquid-crystalline polymer composition according to the present invention exhibits improved molding flowability without impairing mechanical properties.

10 Claims, No Drawings

ID-CRYSTALLINE POLYMER COMPOSITION

TECHNICAL FIELD

The present invention relates to a liquid-crystalline polymer composition which exhibits excellent molding flowability.

BACKGROUND ART

A thermotropic liquid-crystalline polymer (which is hereinafter abbreviated to "LCP") has good properties, including heat resistance, mechanical properties such as rigidity, chemical resistance and dimensional accuracy. Owing to those properties, LCPs are used not only for manufacturing molded articles but also for a variety of products including fibers and film. In the information and telecommunication fields, very thin parts are sometimes required. Personal computers and mobile phones in particular employ highly integrated devices and those skilled in the art wish to use downsized, thinner and smaller parts for them. Because of the excellent molding processability of the LCPs, i.e., good flowability and less formation of burrs, consumption of LCPs has been increasing recently.

However, electronic parts used in the information and telecommunication fields are getting thinner and more complex from day to day, and therefore, the art requires further improvement of molding flowability of LCPs.

A wide variety of methods for improving the molding flowability of LCPs have been proposed. For example, Patent document 1 discloses a method for producing an LCP resin composition having improved fluidity which comprises blending liquid-crystalline polymers having specific molecular weights. Patent document 2 discloses a method for producing an LCP resin composition improved in terms of fluidity which comprises admixing an oligomer of 4-hydroxybenzoic acid having a specific flow temperature into a liquid-crystalline polymer. Patent document 3 discloses a method for producing a liquid-crystalline resin having excellent fluidity by means of a melt polymerization reaction involving acetic acid elimination wherein the reaction liquid is sent to and passed through a vertical stirring thin-film evaporator to decrease acetic acid generation by the liquid-crystalline resin thus obtained. Patent document 4 discloses a method for producing a liquid-crystalline polymer having improved fluidity which comprises adding a phosphoric acid-based compound to the reaction system.

However, the methods disclosed in Patent documents 1 and 2 are problematic in that the manufacture of the liquid-crystalline polymers having specific molecular weights, and in that the manufacture of the oligomer of 4-hydroxybenzoic acid having the specific flow temperature is not easy. The method disclosed in Patent document 3 is problematic in that it requires the use of specialized equipment such as a vertical stirring thin-film evaporator. The method disclosed in Patent document 4 is problematic in that there is significant impairment of mechanical properties of the liquid-crystalline polymer depending on the type and amount of the phosphoric acid-based compound used.

In view of the problems in the above-mentioned methods, those skilled in the art wish to develop an LCP composition which exhibits improved molding flowability without impairing its mechanical properties and which can be produced from inexpensive and easily available materials without the use of specialized equipment.

[Patent document 1] Japanese Patent Application Laid Open No. Hei 2-173156 corresponding to U.S. Pat. No. 5,766,507
[Patent document 2] Japanese Patent Application Laid Open No. Hei 3-095260 corresponding to U.S. Pat. No. 5,352,746
[Patent document 3] Japanese Patent Application Laid Open No. 2000-309636
[Patent document 4] Japanese Patent Application Laid Open No. Hei 06-032880

SUMMARY OF THE INVENTION

Problem to be Solved by the Invention

One object of the present invention is to provide a liquid-crystalline polymer composition which exhibits improved molding flowability without impairment of its mechanical properties.

Means to Solve the Problem

The present inventors conducted studies on the improvement of molding flowability of liquid-crystalline polymers. As a result, the present inventors have found that admixing two types of talc particles, each of which has a specific range of aspect ratios and a specific range of median particle diameters, into a liquid-crystalline polymer within a specific range of weight ratios can yield a liquid-crystalline polymer composition which exhibits significantly improved molding flowability without impairment of mechanical properties.

The present invention provides a liquid-crystalline polymer composition comprising: 100 parts by weight of a liquid-crystalline polymer and 1-150 parts by weight of the total weight of talc particles (A) and talc particles (B),
wherein
talc particles (A) have an aspect ratio of 3.1-5.0 and a median particle diameter of 5-100 µm; and
talc particles (B) have an aspect ratio of 1.0-3.0 and a median particle diameter of 5-100 µm;
wherein the weight ratio of talc particles (A)/talc particles (B) is from 1/9 to 9/1.

DETAILED DESCRIPTION OF THE PREFERRED EMBODIMENTS

The liquid-crystalline polymer used for the liquid-crystalline polymer composition of the present invention is not specifically limited and may be any polyester resin or polyesteramide resin which exhibits an anisotropic melt phase and is called a "thermotropic liquid-crystalline polymer" by those skilled in the art.

The anisotropic melt phase can be confirmed by means of a conventional polarized light system using an orthogonal light polarizer. In more detail, the sample on the hot stage under a nitrogen atmosphere may be observed.

The liquid-crystalline polymer used for the present invention may comprise two or more types of the liquid-crystalline polymer or may be a liquid-crystalline polymer blend which is obtainable by melt-mixing two or more types of liquid-crystalline polyester resin and/or liquid-crystalline polyesteramide resin.

The liquid-crystalline polymer used for the present invention may be a semiaromatic liquid-crystalline polymer which has aliphatic groups in its molecular chain or may be a wholly aromatic liquid-crystalline polymer whose molecular chain is wholly composed of aromatic groups. Among these liquid-crystalline polymers, a wholly aromatic liquid-crystalline polymer is preferable and a wholly aromatic liquid-crystalline polyester resin is especially preferable because of its good flame retardancy and mechanical properties.

The liquid-crystalline polymer used for the present invention is composed of aromatic oxycarbonyl repeating units, aromatic dicarbonyl repeating units, aromatic dioxy repeating units, aromatic aminooxy repeating units, aromatic diamino repeating units, aromatic aminocarbonyl repeating units, aromatic oxydicarbonyl repeating units, aliphatic dioxy repeating units and the like.

Examples of monomers which provide the aromatic oxycarbonyl repeating units are para-hydroxybenzoic acid, meta-hydroxybenzoic acid, ortho-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid and alkyl-, alkoxy- or halogen-substituted derivatives as well as ester-forming derivatives such as acyl derivatives, ester derivatives and acid halide thereof.

Among the above, para-hydroxybenzoic acid and 6-hydroxy-2-naphthoic acid are preferable, since they can make it easy to control the properties and the melting point of the resulting liquid crystalline polymer.

Examples of monomers which provide the aromatic dicarbonyl repeating units are aromatic dicarboxylic acids such as terephthalic acid, isophthalic acid,2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybipheny and alkyl-, alkoxy- or halogen-substituted derivatives as well as ester-forming derivatives such as ester derivatives and acid halide thereof.

Among the above, terephthalic acid and 2,6-naphthalenedicarboxylic acid are preferably used, since they can make it easy to control the mechanical properties, the heat resistance, the melting point and the moldability of the resulting liquid crystalline polymer.

Examples of monomers which provide the aromatic dioxy repeating units are aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyether and alkyl-, alkoxy- orhalogen-substituted derivatives as well as ester-forming derivatives such as acyl derivatives thereof.

Among the above, hydroquinone and 4,4'-dihydroxybipheny are preferable because of their good reactivity during the polymerization process and the excellent properties of the resulting liquid-crystalline polymer.

Examples of monomers which provide the aromatic aminooxy repeating units are aromatic hydroxyamines such as p-aminophenol, m-aminophenol, 4-amino-1-naphthol,5-amino-1-naphthol, 8-amino-2-naphthol, 4-amino-4'-hydroxybiphenyl and alkyl-, alkoxy- or halogen-substituted derivatives as well as ester- or amide-forming derivatives such as acyl derivatives thereof.

Examples of monomers which provide the aromatic diamino repeating units are aromatic diamines such as p-phenylenediamine, m-phenylenediamine, 1,5-diaminonaphthalene, 1,8-diaminonaphthalene and alkyl-, alkoxy- or halogen-substituted derivatives as well as amide-forming derivatives such as acyl derivatives thereof.

Examples of monomers which provide the aromatic aminocarbonyl repeating units are aromatic aminocarboxylic acids such as p-aminobenzoic acid, m-aminobenzoic acid, 6-amino-2-naphthoic acid and alkyl-, alkoxy- or halogen-substituted derivatives as well as ester- or amide-forming derivatives such as acyl derivatives, ester derivatives and acid halide thereof.

Examples of monomers which provide the aromatic oxydicarbonyl repeating units are hydroxy aromatic dicarboxylic acids such as 3-hydroxy-2,7-naphthalenedicarboxylic acid, 4-hydroxyisophthalic acid, 5-hydroxyisophthalic acid and alkyl-, alkoxy- or halogen-substituted derivatives as well as ester-forming derivatives such as acyl derivatives, ester derivatives and acid halide thereof.

Examples of monomers which provide the aliphatic dioxy repeating units are aliphatic diols such as ethyleneglycol, 1,4-butanediol, 1,6-hexanediol and acyl derivatives thereof.

In addition, the liquid-crystalline polymer comprising the aliphatic dioxy repeating units may be obtained by reacting the polymers comprising aliphatic dioxy repeating units such as polyethylene terephthalate and polybutylene terephthalate with the above-described monomers such as aromatic oxycarboxylic acids, aromatic dicarboxylic acids, aromatic diols and acyl derivatives, ester derivatives and acid halide thereof.

Further, the liquid-crystalline polymer used in the present invention may comprise thioester bonding unless it impairs the object of the present invention. Examples of monomers which provide the thioester bonding are mercapto aromatic carboxylic acids, aromatic dithiols and hydroxy aromatic thiols. The proportion of these monomers to the total monomers which provide aromatic oxycarbonyl repeating units, aromatic dicarbonyl repeating units, aromatic dioxy repeating units, aromatic aminooxy repeating units, aromatic diamino repeating units, aromatic aminocarbonyl repeating units, aromatic oxydicarbonyl repeating units and aliphatic dioxy repeating units is preferably equal to or less than 10 mole %.

The liquid-crystalline polymers comprising the above described repeating units may include both those which exhibit an anisotropic melt phase and those which do not, depending on the structural components of the polymer, and the ratio and sequence distribution of the components. The liquid-crystalline polymers used for the present invention are limited to those exhibiting an anisotropic melt phase.

Examples of preferable liquid-crystalline polymers used for the liquid-crystalline polymer composition of the present invention include a wholly aromatic liquid-crystalline polyester resin consisting of the repeating units represented by the formulae (I)-(IV):

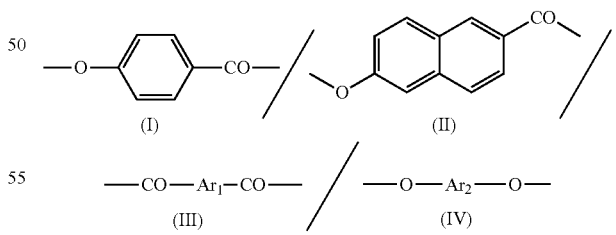

wherein $Ar_1$ and $Ar_2$ independently represent a bivalent aromatic group; and wherein the expression "aromatic group" represents a 6-membered monocyclic or fused bicyclic aromatic group.

More preferably, $Ar_1$ and $Ar_2$ are one or more groups independently selected from the following aromatic groups (1)-(4). Even more preferably, $Ar_1$ is the aromatic group (1) and/or (4) and $Ar_2$ is the aromatic group (1) and/or (3).

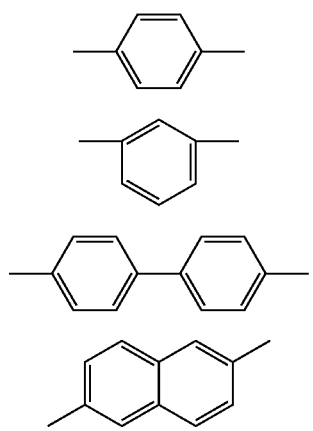

Examples of preferable combinations of repeating units constituting the liquid-crystalline polymers used in the present invention are listed below:
1) 4-hydroxybenzoic acid/2-hydroxy-6-naphthoic acid copolymer
2) 4-hydroxybenzoic acid/terephthalic acid/4,4'-dihydroxybiphenyl copolymer
3) 4-hydroxybenzoic acid/terephthalic acid/isophthalic acid/4,4'-dihydroxybiphenyl copolymer
4) 4-hydroxybenzoic acid/terephthalic acid/isophthalic acid/4,4'-dihydroxybiphenyl/hydroquinone copolymer
5) 4-hydroxybenzoic acid/terephthalic acid/hydroquinone copolymer
6) 2-hydroxy-6-naphthoic acid/terephthalic acid/hydroquinone copolymer
7) 4-hydroxybenzoic acid/2-hydroxy-6-naphthoic acid/terephthalic acid/4,4'-dihydroxybiphenyl copolymer
8) 2-hydroxy-6-naphthoic acid/terephthalic acid/4,4'-dihydroxybiphenyl copolymer
9) 4-hydroxybenzoic acid/2-hydroxy-6-naphthoic acid/terephthalic acid/hydroquinone copolymer
10) 4-hydroxybenzoic acid/2-hydroxy-6-naphthoic acid/terephthalic acid/hydroquinone/4,4'-dihydroxybiphenyl copolymer
11) 4-hydroxybenzoic acid/2,6-naphthalenedicarboxylic acid/4,4'-dihydroxybiphenyl copolymer
12) 4-hydroxybenzoic acid/terephthalic acid/2,6-naphthalenedicarboxylic acid/hydroquinone copolymer
13) 4-hydroxybenzoic acid/2,6-naphthalenedicarboxylic acid/hydroquinone copolymer
14) 4-hydroxybenzoic acid/2-hydroxy-6-naphthoic acid/2,6-naphthalenedicarboxylic acid/hydroquinone copolymer
15) 4-hydroxybenzoic acid/terephthalic acid/2,6-naphthalenedicarboxylic acid/hydroquinone/4,4'-dihydroxybiphenyl copolymer
16) 4-hydroxybenzoic acid/terephthalic acid/4-aminophenol copolymer
17) 2-hydroxy-6-naphthoic acid/terephthalic acid/4-aminophenol copolymer
18) 4-hydroxybenzoic acid/2-hydroxy-6-naphthoic acid/terephthalic acid/4-aminophenol copolymer
19) 4-hydroxybenzoic acid/terephthalic acid/4,4'-dihydroxybiphenyl/4-aminophenol copolymer
20) 4-hydroxybenzoic acid/terephthalic acid/ethyleneglycol copolymer
21) 4-hydroxybenzoic acid/terephthalic acid/4,4'-dihydroxybiphenyl/ethyleneglycol copolymer
22) 4-hydroxybenzoic acid/2-hydroxy-6-naphthoic acid/terephthalic acid/ethyleneglycol copolymer
23) 4-hydroxybenzoic acid/2-hydroxy-6-naphthoic acid/terephthalic acid/4,4'-dihydroxybiphenyl/ethyleneglycol copolymer
24) 4-hydroxybenzoic acid/terephthalic acid/2,6-naphthalenedicarboxylic acid/4,4'-dihydroxybiphenyl copolymer.

Methods for preparing the liquid-crystalline polymer used for the present invention are explained below.

The method for preparing the liquid-crystalline polymer used for the present invention is not limited and any methods known to the art can be employed. For example, conventional polymerization methods such as molten acidolysis and slurry polymerization methods for preparing polymers to provide ester and/or amide bonding among the monomers which yield the above-described repeating units may be employed.

The molten acidolysis method is preferably used for preparing the liquid-crystalline polymer used for the present invention. In this method, monomers are heated to yield a molten solution and then the solution is reacted to yield a molten polymer. The final step of this method may be carried out in vacuo to facilitate removal of volatile by-products such as acetic acid or water.

The slurry polymerization method is characterized by the fact that monomers are reacted in a heat-exchange fluid to give a solid-state polymer in the form of suspension in the heat-exchange liquid medium.

In either the molten acidolysis method or the slurry polymerization method, the polymerizing monomers which are used for preparing the liquid-crystalline polymer may be in the form of lower acyl derivatives obtained by acylating the hydroxyl and/or amino groups at room temperature. The lower acyl group may have preferably 2-5, and more preferably 2-3, carbon atoms. Acetylated monomers are the most preferably used for the reaction.

The lower acyl derivatives of the monomers may be those prepared beforehand by acylating the monomers independently or may be those produced in the reaction system by adding an acylating agent such as acetic anhydride to the monomers upon preparing the liquid-crystalline polymer.

In either the molten acidolysis method or the slurry polymerization method, a catalyst may be used in the reaction, if desired.

Examples of catalysts include organic tin compounds such as dialkyl tin oxide (ex. dibutyl tin oxide) and diaryl tin oxide; organic titanium compounds such as titanium dioxide, antimony trioxide, alkoxy titanium silicate and titanium alkoxide; alkaline or alkaline earth metal salts of carboxylic acids such as potassium acetate; salts of inorganic acids (ex. $K_2SO_4$); Lewis acids (ex. $BF_3$); and gaseous acid catalysts such as halogenated hydrogen (ex. HCl).

When a catalyst is used, the amount of the catalyst added to the reaction based on the total weight of the monomers may preferably be 1-1000 ppm, and more preferably 2-100 ppm.

The liquid-crystalline polymer may be obtained from the polymerizing reaction vessel in a molten state and processed to give pellets, flakes or powder.

Thereafter, the liquid-crystalline polymer in the form of pellets, flakes or powder may be subjected to a solid-phase heating process in vacuo or under an inert gas atmosphere in order to increase the molecular weight and to improve the heat-resistance and the like, if desired.

The temperature of the heating process in the solid phase is not limited unless the liquid-crystalline polymer is melted, but is preferably 260-350° C. and more preferably 280-320° C.

To the liquid-crystalline polymer thus obtained, two types of talc particles (A) and talc particles (B) defined below are added such that the total weight of talc particles (A) and talc particles (B) is 1-150 parts by weight per 100 parts by weight of the liquid-crystalline polymer and that the weight ratio of talc particles (A)/talc particles (B) is 1/9-9/1 to yield the liquid-crystalline polymer composition of the present invention:

talc particles (A): talc particles having an aspect ratio of 3.1-5.0 and a median particle diameter of 5-100 μm; and
talc particles (B): talc particles having an aspect ratio of 1.0-3.0 and a median particle diameter of 5-100 μm.

In the present invention, the median particle diameter of talc particles is the median diameter of the talc particles determined by laser diffractometry.

In the present invention, the aspect ratio of talc particles is the average aspect ratio of the talc particles determined using a Multi Image Analyzer (Beckman Coulter, Inc.) based on the Coulter principle, by the following steps:

i) flashing the strobe lamp in response to the voltage pulse generated when a particle of talc passes through a fine pore,
ii) photographing the projection image of the particle; and
iii) analyzing the projection image;

wherein, the aspect ratio of the particle of talc is calculated by the formula (X)/(Y); wherein (X) is the maximum length between two arbitrary points on the outer circumference of the projection image and (Y) is the minimum distance between two straight lines which are contacted with the projection image and are parallel to the line connecting two points used for determining the maximum length (X).

In the present invention, the aspect ratio of talc particles (A) is preferably 3.2-4.5 and more preferably 3.3-4.0. The median particle diameter of talc particles (A) is preferably 10-50 μm and more preferably 22-30 μm.

In the present invention, the aspect ratio of talc particles (B) is preferably 1.3-2.9 and more preferably 1.5-2.8. The median particle diameter of talc particles (B) is preferably 8-45 μm and more preferably 15-21 μm.

In the present invention, the total weight of talc particles (A) and talc particles (B) is preferably 5-120 parts by weight and more preferably 10-100 parts by weight per 100 parts by weight of the liquid-crystalline polymer.

If the total weight of talc particles (A) and talc particles (B) is less than 1 part by weight per 100 parts by weight of the liquid-crystalline polymer, the resulting liquid-crystalline polymer composition tends to develop warpage. On the other hand, if the total weight of talc particles (A) and talc particles (B) is more than 150 parts by weight per 100 parts by weight of the liquid-crystalline polymer, the resulting liquid-crystalline polymer composition tends to exhibit decreased mechanical strength.

In the present invention, the weight ratio of talc particles (A)/talc particles (B) is preferably 2/8-8/2 and more preferably 3/7-7/3. If the weight ratio of talc particles (A)/talc particles (B) is outside the range 1/9-9/1, the resulting liquid-crystalline polymer composition tends to exhibit decreased flowability.

The liquid-crystalline polymer composition of the present invention may further comprise one or more fibrous, lamellar or powdery inorganic fillers other than talc unless the fibrous, lamellar or powdery inorganic fillers impair the object of the present invention.

Examples of the inorganic fillers which may be comprised in the liquid-crystalline polymer composition of the present invention include at least one of the following: glass fiber, milled glass, silica-alumina fiber, alumina fiber, carbon fiber, aramid fiber, potassium titanate whisker, aluminium borate whisker, wollastonite, mica, graphite, calcium carbonate, dolomite, clay, glass flake, glass beads, barium sulfate and titanium oxide. Among them, glass fiber is preferably used because of its good balance of physical properties and cost.

The liquid-crystalline polymer composition of the present invention may comprise 1-150 parts by weight, preferably 5-100 parts by weight of the inorganic fillers other than talc per 100 parts by weight of the liquid-crystalline polymer.

When the liquid-crystalline polymer composition of the present invention comprises the inorganic fillers other than talc, the total weight of the inorganic fillers other than talc, talc particles (A) and talc particles (B) is preferably 2-200 parts by weight, and more preferably 5-150 parts by weight per 100 parts by weight of the liquid-crystalline polymer.

If the weight of the inorganic fillers other than talc is greater than 150 parts by weight per 100 parts by weight of the liquid-crystalline polymer, the molding processability of the liquid-crystalline polymer composition tends to be decreased or the exhausting of the cylinder or die of the molding device tends to be increased.

The liquid-crystalline polymer composition according to the present invention may further comprise one or more additional additives, unless the additional additives impair the object of the present invention. For example, molding lubricants such as higher aliphatic acid, higher aliphatic ester, higher aliphatic amide, higher aliphatic acid metal salt, polysiloxane and fluorocarbon resin; colorants such as dyes and pigments; antioxidants; thermal stabilizers; UV absorbents; antistatic agents; and surface active agents may be comprised. The term "higher" group herein used refers to the group of 10-25 carbon atoms.

The liquid-crystalline polymer composition of the present invention may comprise 0.1-10 parts by weight, and preferably 0.5-5 parts by weight of the additional additives per 100 parts by weight of the liquid-crystalline polymer.

If the weight of the additional additives is greater than 10 parts by weight per 100 parts by weight of the liquid-crystalline polymer, the molding processability of the liquid-crystalline polymer composition tends to be decreased, or the thermal stability of the liquid-crystalline polymer composition tends to be impaired.

Molding lubricants such as higher aliphatic acid, higher aliphatic ester, higher aliphatic acid metal salt or fluorocarbon-type surfactant may be added to pellets of the liquid-crystalline polymer composition before subjecting the pellets to the molding process, so that the agents adhere to the outer surfaces of the pellets.

The liquid-crystalline polymer composition of the present invention may comprise one or more additional resin components unless the additional resin components impair the object of the present invention. Examples of additional resin components include thermoplastic resins such as polyamide, polyester, polyacetal, polyphenylene ether and denatured derivatives thereof, polysulfone, polyethersulfone, polyetherimide and polyamideimide, and thermosetting resins such as phenol resin, epoxy resin and polyimide resin.

The weight of the additional resin components is not limited, and may be determined depending on the intended property of the liquid-crystalline polymer composition. Typically, such additional resin components may be comprised in the liquid-crystalline polymer composition in an amount of 0.1-100 parts by weight, and preferably 0.1-80 parts by weight per 100 parts by weight of the liquid-crystalline polymer.

The liquid-crystalline polymer composition of the present invention is obtained by mixing the liquid-crystalline polymer, the two types of talc particles (A) and talc particles (B), the inorganic fillers other than talc, the additional additives and the additional resin components. The liquid-crystalline polymer composition of the present invention may be obtained by melt-kneading the mixture of the liquid-crystalline polymer, talc particles (A) and talc particles (B), the inorganic fillers other than talc, the additional additives and/or the additional resin components using a kneading machine such as a Banbury mixer, a kneader, a single-screw extruder, a twin-screw extruder or the like at a temperature within a range starting from the crystalline melting temperature of the liquid-crystalline polymer and extending to the crystalline melting temperature+20° C.

The liquid-crystalline polymer composition thus obtained according to the present invention exhibits improved molding flowability and develops less warpage. The liquid-crystalline polymer composition of the present invention may be processed in a conventional manner to yield molded articles, film, sheets, bonded textiles and the like. For example, injection molding or extrusion techniques may preferably be used.

The liquid-crystalline polymer composition according to the present invention exhibits excellent molding flowability and causes less warpage and fewer blisters even at a high temperature, and is therefore suitable for manufacturing switches, relays, connectors, chips, optical pickups, inverter trans, coil bobbins, antennae, substrates or the like which are manufactured via high temperature processes such as reflow processes.

EXAMPLES

The present invention is further described with reference to the following examples. The following examples are intended to illustrate the invention and are not to be construed as limiting the scope of the invention.

First of all, Synthesis Examples of liquid-crystalline polymers used in Examples and Comparative Examples are described.

In the Synthesis Examples, the following abbreviations are used.
[Monomers used for Synthesizing Liquid-Crystalline Polymers]
POB: para-hydroxybenzoic acid
BON6: 6-hydroxy-2-naphthoic acid
HQ: hydroquinone
BP: 4,4'-dihydroxybiphenyl
TPA: terephthalic acid
NDA: 2,6-naphthalenedicarboxylic acid Synthesis Example 1

The Synthesis of LCP-1 (POB/BON6/HQ/TPA)
POB (386.0 g, 43 mole %), BON6 (183.5 g, 15 mole %), HQ (150.3 g, 21 mole %) and TPA (226.7 g, 21 mole %) were fed into a reaction container equipped with an agitating device with a torque-meter and a condenser. Then acetic anhydride 1.025 fold moles to the total amount (moles) of hydroxy groups of the monomers was added to the container. The mixture was subjected to a polymerization reaction involving acetic acid elimination under the following conditions.

Under a nitrogen atmosphere, the mixture was heated from room temperature to 145° C. over a period of 1 hour and kept at 145° C. for 30 minutes, then heated to 350° C. over a period of 7 hours while the by-product acetic acid was distilled out. Then the pressure was reduced to 10 mmHg over a period of 80 minutes. When the torque reached the predetermined level, the polymerization reaction was terminated. The resulting polymer was removed from the container and crushed with a crusher to yield pellets of a liquid-crystalline polymer. As a result, the approximately calculated theoretical amount of acetic acid was distilled out.

Synthesis Example 2

The Synthesis of LCP-2 (POB/BON6/HQ/NDA)
POB (628.4 g, 70 mole %), BON6 (24.5 g, 2 mole %), HQ (100.2 g, 14 mole %) and NDA (196.7 g, 14 mole %) were fed into a reaction container equipped with an agitating device with a torque-meter and a condenser. Then acetic anhydride 1.03 fold moles to the total amount (moles) of hydroxy groups of the monomers was added to the container. The mixture was subjected to a polymerization reaction under the following conditions.

Under a nitrogen atmosphere, the mixture was heated from room temperature to 145° C. over a period of 1 hour and kept at 145° C. for 30 minutes, then heated to 345° C. over a period of 7 hours while the by-product acetic acid was distilled out. Then the pressure was reduced to 10 mmHg over a period of 80 minutes. When the torque reached the predetermined level, the polymerization reaction was terminated. The resulting polymer was removed from the container and crushed with a crusher to yield pellets of a liquid-crystalline polymer. As a result, the approximately calculated theoretical amount of acetic acid was distilled out.

Synthesis Example 3

The Synthesis of LCP-3 (POB/BON6/HQ/BP/TPA)
POB (314.2 g, 34 mole %), BON6 (61.2 g, 5 mole %), BP (169.4 g, 14 mole %), HQ (114.5 g, 16 mole %) and TPA (323.9 g, 30 mole %) were fed into a reaction container equipped with an agitating device with a torque-meter and a condenser. Then acetic anhydride 1.03 fold moles to the total amount (moles) of hydroxy groups of the monomers was added to the container. The mixture was subjected to a polymerization reaction under the following conditions.

Under a nitrogen atmosphere, the mixture was heated from room temperature to 145° C. over a period of 1 hour and kept at 145° C. for 30 minutes, then heated to 350° C. over a period of 7 hours while the by-product acetic acid was distilled out. Then the pressure was reduced to 5 mmHg over a period of 80 minutes. When the torque reached the predetermined level, the polymerization reaction was terminated. The resulting polymer was removed from the container and crushed with a crusher to yield pellets of a liquid-crystalline polymer. As a result, the approximately calculated theoretical amount of acetic acid was distilled out.

<Talc Particles>
Talc 1: HK-A, FUJI TALC INDUSTRIAL CO., LTD. (aspect ratio 3.6, median particle diameter 24.0 μm, moisture content 0.13% by weight)
Talc 2: NK-64, FUJI TALC INDUSTRIAL CO., LTD. (aspect ratio 2.6, median particle diameter 19.0 μm, moisture content 0.50% by weight)
<Fibrous Inorganic Filler>
Glass fiber: ECS3010A, Chongqing Polycomp International Corporation (average fiber length 10.5 μm)

Examples 1-3 and Comparative Examples 1-2

As a liquid-crystalline polymer, LCP-1 was used. LCP-1, talc particles and the fibrous inorganic filler (glass fiber) were mixed. The parts by weight of the talc particles and the fibrous inorganic filler per 100 parts by weight of LCP-1 are shown in Table 1. The mixture was melt-kneaded using a twin-screw extruder (TEX-30α, The Japan Steel Works, LTD.) to yield pellets of a liquid-crystalline polymer composition.

Deflection temperature under load (DTUL), tensile strength, flexural strength, flexural modulus, Izod impact strength, crystalline melting temperature, crystallization temperature and flow length of the liquid-crystalline polymer composition were assessed by the following procedures. The results are shown in Table 1.

TABLE 1

|  | Example 1 | Example 2 | Example 3 | Comparative Example 1 | Comparative Example 2 |
|---|---|---|---|---|---|
| LCP-1 (parts by weight) | 100 | 100 | 100 | 100 | 100 |
| Talc 1 (parts by weight) | 21.5 | 16.5 | 11.5 | 33 | 0 |
| Talc 2 (parts by weight) | 11.5 | 16.5 | 21.5 | 0 | 33 |
| Glass fiber (parts by weight) | 33 | 33 | 33 | 33 | 33 |
| DTUL (° C.) | 248.6 | 248.7 | 249.3 | 248.4 | 248.8 |
| Tensile strength (MPa) | 130 | 130 | 127 | 127 | 130 |
| Flexural strength (MPa) | 175 | 174 | 168 | 176 | 178 |
| Flexural modulus (GPa) | 13 | 13 | 13 | 13 | 13 |
| Izod impact strength (J/m) | 50 | 52 | 51 | 50 | 52 |
| Crystalline melting temperature (° C.) | 332 | 325 | 333 | 325 | 332 |
| Crystallization temperature (° C.) | 278 | 277 | 278 | 278 | 277 |
| Flow length | 19.06 | 20.05 | 19.27 | 17.89 | 18.77 |

(1) Deflection Temperature Under Load (DTUL)

A test piece with a length of 127 mm, a width of 12.7 mm and a thickness of 3.2 mm was molded using an injection-molding machine (UH1000-110, Nissei Plastic Industrial Co., Ltd., Japan) under the conditions shown in Table 2. Deflection temperature was measured using the test piece according to ASTM D648 under a load of 1.82 MPa and at a heating rate of 2° C./min.

TABLE 2

| Molding machine | UH-1000-110 Nissei Plastic Industrial Co., Ltd. |
|---|---|
| Cylinder temperature | 350-350-350-310-280 (° C.) |
| Mold temperature | 70 (° C.) |
| Injection speed | 60 mm/sec |
| Follow up pressure | 300 kg/cm² |
| Injection time | 7 sec |
| Cool time | 9 sec |
| Screw rotation speed | 150 rpm |
| Screw back-pressure | 5 kg/cm² |

(2) Tensile Strength

A dumbbell-shaped specimen (ASTM Type 4) was molded using an injection molding machine (UH1000-110, Nissei Plastic Industrial Co., Ltd., Japan) under the conditions shown in Table 2. Tensile strength was measured using the specimen according to ASTM D638.

(3) Flexural Strength and Flexural Modulus

Flexural strength and flexural modulus were measured according to ASTM D790 using the same test piece as that used for measuring deflection temperature under load.

(4) Izod Impact Strength

The central part of the same test piece as that used for measuring deflection temperature under load was vertically cut in a breadthwise direction to yield a test piece with a length of 63.5 mm, a width of 12.7 mm and a thickness of 3.2 mm. Izod impact strength was measured according to ASTM D256 using the test piece.

(5) Crystallization Temperature and Crystalline Melting Temperature

The differential scanning calorimeter (DSC) Exstar 6000 (Seiko Instruments Inc., Japan) or the same type of DSC device was used. The LCP composition sample to be examined was heated from room temperature at a rate of 20° C./minute and the endothermic peak (Tm1) was recorded. Thereafter, the sample was kept at a temperature 20-50° C. higher than Tm1 for 10 minutes. The sample was then cooled to room temperature at a rate of 20° C./minute and the exothermic peak was recorded. The exothermic peak found in this step was recorded as the crystallization temperature (Tc) of the LCP composition sample. Further, the sample was heated again at a rate of 20° C./minute. The endothermic peak found in the final step was recorded as the crystalline melting temperature (Tm) of the LCP composition sample.

(6) Flowability

The LCP composition was injected into a rectangular parallelepiped bar flow die with a length of 127 mm, a width of 12.7 mm and a thickness of 0.2 mm using an injection molding machine (NEX-15-1E, Nissei Plastic Industrial Co., Ltd., Japan) under the conditions shown in Table 3 and the flow length of the LCP composition injected into the bar flow die was measured.

TABLE 3

| Molding machine | NEX-15-1E Nissei Plastic Industrial Co., Ltd. |
|---|---|
| Cylinder temperature | 350-340-280 (° C.) |
| Mold temperature | 80 (° C.) |
| Injection speed | 300 mm/sec |
| Follow up pressure | 30 MPa |
| Injection time | 2 sec |
| Cool time | 5 sec |
| Screw rotation speed | 150 rpm |
| Screw back-pressure | 5 MPa |

Example 4 and Comparative Examples 3-4

As a liquid-crystalline polymer, LCP-2 was used. LCP-2, talc particles and the fibrous inorganic filler (glass fiber) were mixed. The parts by weight of the talc particles and the fibrous inorganic filler per 100 parts by weight of LCP-2 are shown in Table 4. The mixture was melt-kneaded using a twin-screw extruder (TEX-30α, The Japan Steel Works, LTD.) to yield pellets of a liquid-crystalline polymer composition.

Deflection temperature under load (DTUL), tensile strength, flexural strength, flexural modulus, Izod impact strength, crystalline melting temperature, crystallization temperature and flow length of the liquid-crystalline polymer composition were assessed by the same procedures as those in Example 1. The results are shown in Table 4.

TABLE 4

|  | Example 4 | Comparative Example 3 | Comparative Example 4 |
|---|---|---|---|
| LCP-2 (parts by weight) | 100 | 100 | 100 |
| Talc 1 (parts by weight) | 16.5 | 33 | 0 |
| Talc 2 (parts by weight) | 16.5 | 0 | 33 |
| Glass fiber (parts by weight) | 33 | 33 | 33 |
| DTUL (° C.) | 280.5 | 281.5 | 280.7 |
| Tensile strength (MPa) | 128 | 135 | 139 |
| Flexural strength (MPa) | 188 | 185 | 185 |
| Flexural modulus (GPa) | 13 | 13 | 13 |
| Izod impact Strength (J/m) | 58 | 60 | 56 |
| Crystalline melting temperature (° C.) | 316 | 317 | 319 |
| Crystallization temperature (° C.) | 281 | 281 | 287 |
| Flow length | 16.00 | 15.12 | 15.49 |

Example 5 and Comparative Examples 5-6

As a liquid-crystalline polymer, LCP-3 was used. LCP-3, talc particles and the fibrous inorganic filler (glass fiber) were mixed. The parts by weight of the talc particles and the fibrous inorganic filler per 100 parts by weight of LCP-3 are shown in Table 5. The mixture was melt-kneaded using a twin-screw extruder (TEX-30α, The Japan Steel Works, LTD.) to yield pellets of a liquid-crystalline polymer composition.

Deflection temperature under load (DTUL), tensile strength, flexural strength, flexural modulus, Izod impact strength, crystalline melting temperature, crystallization temperature and flow length of the liquid-crystalline polymer composition were assessed by the same procedures as those in Example 1. The results are shown in Table 5.

TABLE 5

|  | Example 5 | Comparative Example 5 | Comparative Example 6 |
|---|---|---|---|
| LCP-3 (parts by weight) | 100 | 100 | 100 |
| Talc 1 (parts by weight) | 16.5 | 33 | 0 |
| Talc 2 (parts by weight) | 16.5 | 0 | 33 |
| Glass fiber (parts by weight) | 33 | 33 | 33 |
| DTUL (° C.) | 267.8 | 267.9 | 268.0 |
| Tensile strength (MPa) | 109 | 114 | 110 |
| Flexural strength (MPa) | 157 | 159 | 160 |
| Flexural modulus (GPa) | 11 | 11 | 11 |
| Izod impact Strength (J/m) | 55 | 56 | 54 |
| Crystalline melting temperature (° C.) | 339 | 337 | 339 |
| Crystallization temperature (° C.) | 314 | 313 | 316 |
| Flow length | 18.41 | 17.95 | 18.21 |

When using any of LCP-1, LCP-2 and LCP-3, the LCP compositions comprising both Talc 1 and Talc 2 exhibited longer flow lengths, in other words, improved flowability than those comprising only one of Talc 1 or Talc 2.

What is claimed is:

1. A liquid-crystalline polymer composition comprising: 100 parts by weight of a liquid-crystalline polymer and 1-150 parts by weight of the total weight of talc particles (A) and talc particles (B),
   wherein
   talc particles (A) have an aspect ratio of 3.1-5.0 and a median particle diameter of 22-30 μm; and
   talc particles (B) have an aspect ratio of 1.0-3.0 and a median particle diameter of 15-21 μm;
   wherein the weight ratio of talc particles (A)/talc particles (B) is from 1/9 to 9/1.

2. The liquid-crystalline polymer composition according to claim 1, wherein the liquid-crystalline polymer is a wholly aromatic liquid-crystalline polyester resin.

3. The liquid-crystalline polymer composition according to claim 1, wherein the liquid-crystalline polymer is a liquid-crystalline polyester resin consisting of the repeating units represented by the formulae (I)-(IV):

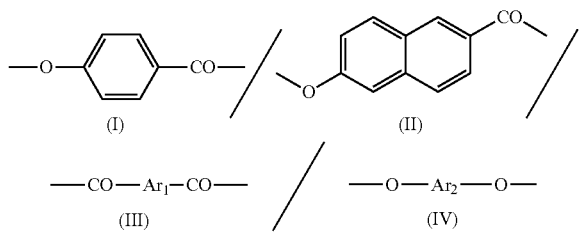

wherein $Ar_1$ and $Ar_2$ independently represent a bivalent aromatic group.

4. The liquid-crystalline polymer composition according to claim 3, wherein $Ar_1$ and $Ar_2$ are one or more groups independently selected from the following aromatic groups (1)-(4)

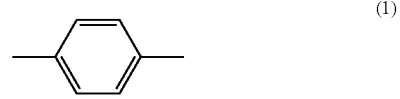

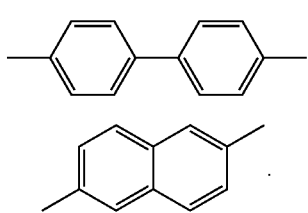

5. The liquid-crystalline polymer composition according to claim 4, wherein Ar$_1$ is the aromatic group (1) and/or (4) defined in claim 4 and Ar$_2$ is the aromatic group (1) and/or (3) defined in claim 4.

6. The liquid-crystalline polymer composition according to claim 1, which further comprises 1-150 parts by weight of a fibrous, lamellar or powdery inorganic filler per 100 parts by weight of the liquid-crystalline polymer.

7. The liquid-crystalline polymer composition according to claim 6, wherein the inorganic filler is selected from the group consisting of glass fiber, milled glass, silica-alumina fiber, alumina fiber, carbon fiber, aramid fiber, potassium titanate whisker, aluminium borate whisker, wollastonite, mica, graphite, calcium carbonate, dolomite, clay, glass flake, glass beads, barium sulfate, titanium oxide and a combination thereof.

8. The liquid-crystalline polymer composition according to claim 6, wherein the inorganic filler is glass fiber.

9. A molded article obtained by molding the liquid-crystalline polymer composition according to claim 1.

10. The molded article according to claim 9, which is selected from the group consisting of switch, relay, connector, chip, optical pickup, inverter trans, coil bobbin, antenna and substrate.

* * * * *